2,972,599

PRODUCTION OF RESINS FROM UNSATURATED ACETALS WITH TRISPHENOLS AND TETRAKISPHENOLS

Howard R. Guest, Charleston, and Joe T. Adams, St. Albans, W. Va., assignors to Union Carbide Corporation, a corporation of New York No Drawing. Filed Mar. 20, 1958, Ser. No. 722,626

14 Claims. (Cl. 260—47)

This invention relates to a new class of thermosetting resins derived from trisphenols and tetrakisphenols. More particularly, this invention relates to thermosetting resins formed by condensing trisphenols and tetrakisphenols with certain unsaturated acetals.

The classic phenolic resins are based on condensation products of phenol and formaldehyde. Such resins are usually made in two stages; the first stage being a partially condensed resin which further polymerizes during the molding cycle to form the familiar molded articles of commerce. As gases are released during such molding cycles, high molding pressures are required. Also, molded articles of phenolic resin are somewhat brittle and lacking in resistance impact.

Another type of resin is derived from bisphenols, such as Bisphenol A (4,4′-dihydroxydiphenyldimethylmethane) by reaction with epichlorohydrin to form the corresponding glycidyl polyethers. Such epoxy compounds are cured with hardening agents such as diethylene triamine to form a useful class of resins, which, however, have relatively low heat distortion points.

We have discovered a new class of resins derived from the condensation of trisphenols or tetrakisphenols with certain unsaturated acetals. These acetals are formed by the reaction of acrolein or substituted acrolein with pentaerythritol. The resulting resins cure without the release of gases to form hard and tough polymers having excellent heat distortion properties.

The unsaturated acetals used in the condensation reaction may be represented by the formula:

$$R'HC=\underset{R}{C}-HC\underset{OCH_2}{\overset{OCH_2}{<}}\underset{CH_2O}{\overset{CH_2O}{>}}CH-\underset{R}{C}=CHR'$$

wherein R is hydrogen, methyl or chlorine and R′ is hydrogen or methyl. A few such compounds are:

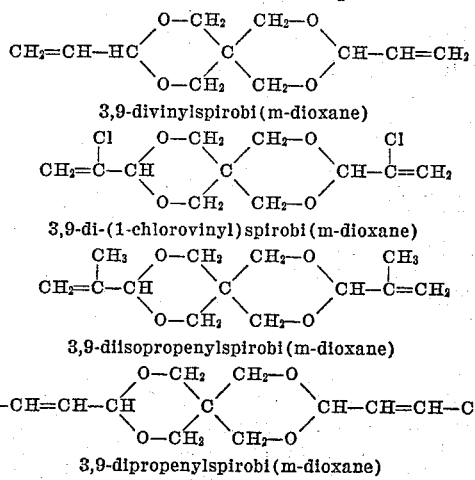

3,9-divinylspirobi(m-dioxane)

3,9-di-(1-chlorovinyl)spirobi(m-dioxane)

3,9-diisopropenylspirobi(m-dioxane)

3,9-dipropenylspirobi(m-dioxane)

Applicants' preferred unsaturated acetal is the 3,9-divinylspirobi(m-dioxane).

Applicants' trisphenols and tetrakisphenols are believed to react with the vinyl groups of the acetals by means of the active hydrogen atoms of the phenols in the ortho and para positions. For example, the para-isomer of 1,1,3-tris(hydroxyphenyl)-propane has six reactive positions all ortho to the hydroxyl groups. The divinyl acetals have two reactive positions. Thus the vinyl groups of the acetal will alkylate this phenol in the ortho positions with the optimum molar ratio of the two reactants being about 1:3 for the phenolic compound and the vinyl compound respectively. However, polymers with good physical properties may be produced even though one of the reactants is used in as much as twice its molar combining ratio.

The tris- and tetrakisphenols of this invention embrace organic compounds which have 3 to 4 phenolic groups attached to an aliphatic radical containing from one to about twelve carbon atoms. The aliphatic chain may be either saturated or unsaturated and can contain substituents such as the hydroxyl group, chlorine, and alkyl radicals such as methyl, propyl and nonyl. The phenolic groups of the tris- and tetrakisphenols can have various substituents such as: alkyl groups, e.g. methyl, propyl and nonyl; halogens, e.g., chlorine; nitrogen-containing groups, e.g., the nitro group; and aryl groups, e.g., phenyl. A preferred group of trisphenols are those wherein the trisphenol is a condensation product of an alpha, beta-unsaturated aldehyde such as acrolein, methacrolein, crotonaldehyde and chloroacrolein with a phenolic compound such as phenol, o-cresol, m-cresol, nonyl phenol, m-xylenol, p-xylenol, p-tertiary amyl phenol, o-nitrophenol, p-nitrophenol, o-chlorophenol, p-chlorophenol and p-phenylphenol. A method for manufacturing the trisphenols is given in U.S. Patent 2,801,989, issued on August 6, 1957, to A. G. Farnham.

The preferred trisphenol is 1,1,3-tris(hydroxyphenyl) propane. The structural formula of the para-isomer is:

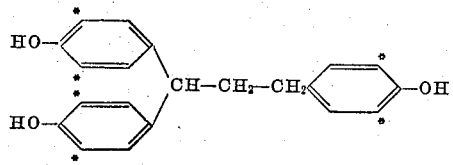

This compound has six reactive positions (all ortho to the phenolic hydroxy group) as indicated by the asterisks. The functionality of the above compound is six and thus it will combine with the unsaturated spiro compounds, which are bifunctional, in a mole ratio of 1:3 at the positions indicated. The other isomers of 1,1,3-tris-(hydroxyphenyl)-propane react in a similar manner to form a resin. Other trisphenols, by way of example are:

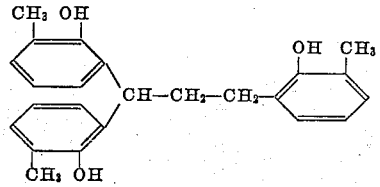

1,1,3-tris(hydroxytolyl)propane

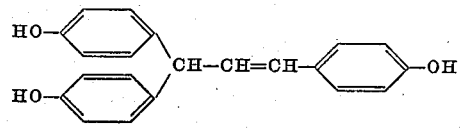

1,1,3-tris(p-hydroxyphenyl)propene-2

The preferred tetrakisphenol is 1,1,2,2-tetrakis-(hydroxyphenyl)ethane. The ortho-hydroxy isomer is represented by the following structural formula:

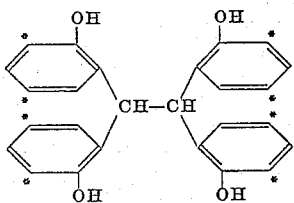

This isomer has eight reactive positions (both ortho- and para- to the phenolic hydroxyl groups) indicated by the asterisks. The functionality of this tetrakisphenol is eight and thus it would react with the unsaturated spiro compounds in a mol ratio of 1:4. Other tetrakisphenols by way of example are:
and

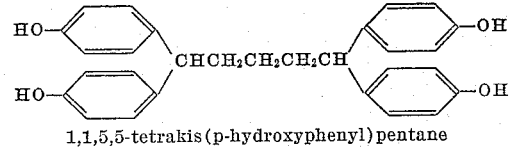

1,1,5,5-tetrakis(p-hydroxyphenyl)pentane and

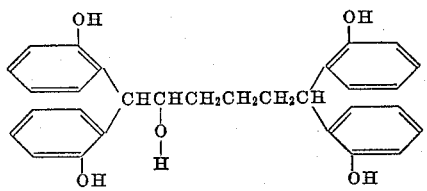

1,1,6,6-tetrakis(o-hydroxyphenyl)hexan-2-ol

The reaction between phenolic compounds and the unsaturated acetals is catalyzed by acids. This reaction is usually conducted from about 130° C. to about 160° C. Strong acids such as sulfuric, phosphoric, hydrochloric, toluenesulfonic, benzenesulfonic or mixed alkanesulfonic acids are effective catalysts. Lewis acids, such as boron trifluoride, aluminum chloride, stannic chloride or titanium tetrachloride can also be used in the reaction. Alkyl sulfates such as diethyl sulfate, also serve as useful catalysts for the reaction. The amount of catalyst used is not critical. Generally, applicants prefer to use from about 0.05 to about 1% of catalyst by weight of the sum of the reactants.

The resins can be cured at temperatures ranging from about 70° C. to about 180° C. The preferred curing temperature range is from about 130° C. to about 160° C. When the resins are cured at the lower temperatures such as 70° C. the reaction is quite slow, often requiring 24–48 hours for a complete cure. At the higher temperatures such as 150° C. the curing reaction can be completed in less than an hour.

Mixtures of phenolic compounds can be employed in the reaction with the unsaturated acetals to form resins with properties intermediate between those obtained with a single phenolic compound. One such mixture, using phenol and 1,1,3-tris(hydroxyphenyl)-propane is illustrated in Example 10.

Outstanding among the properties of applicants' novel copolymers is their heat distortion point which may range as high as 210° C. These copolymers can be used in shell molding and as a binder for abrasive particles in making grinding wheels. The fact that no volatile by-products are liberated during curing gives the copolymers of this invention a decided advantage over conventional phenolic resins in potting, encapsulating and casting applications. Additional toughness can be built into the molecule by the use of minor amounts of diols, such as 1,5-pentanediol.

The following examples are illustrative of the invention.

Example 1

A mixture of 159 g. (0.75 mol) of 3,9-divinylspirobi-(m-dioxane) and 80 g. (0.25 mole of 1,1,3-tris(hydroxyphenyl)propanes was melted and stirred at 55–60° C. while 0.38 g. of mixed alkanesulfonic acids was added. The mixture was then stirred for five minutes at 60° C. and poured into molds. After heating in the oven for 8 hours at 150° C., the product was a hard resin which was dark red in color. The resin had the following physical properties:

| Property | Test Procedure | |
|---|---|---|
| Heat Distortion | ASTM No. D-648-45T | 208° C. |
| Impact (Izod) (Ft.-lbs. per in. of notch). | ASTM No. D-256-47T | 0.2 |
| Hardness (Durometer "D") | | 92 |

Example 2

A mixture of 85 g. (0.4 mole) of 3,9-divinylspirobi-(m-dioxane) and 42 g. (0.133) mole of 1,1,3-tris(hydroxyphenyl)propanes was melted and stirred at 70° C. and then 0.64 g. of phosphoric acid was added. The mixture was stirred five minutes at 70° C. and then cast in bar molds. After curing in an oven for 17 hours at 150° C., a hard resin was obtained which was yellow in color. The cast specimens had the following properties:

Heat distortion _____° C__ 179
Impact (Izod) (ft.-lbs. per in. of notch)_____ 0.2
Hardness (durometer "D")_____ 88

Example 3

Using the same quantities of reactants as set forth in Example 2, 6.6 g. of octylphenyl acid phosphate catalyst was added to the melt of 3,9-divinylspirobi(m-dioxane) and 1,1,3-tris(hydroxyphenyl)-propanes at 78° C. After stirring the mixture for five minutes at 70° C., the mixture was cast into suitable molds and cured at 100° C. for 21 hours. The product was a hard, brittle resin which was similar to that obtained in Example 2.

Example 4

Using the same quantities of reactants as set forth in Example 2, 6.6 g. of phenyl acid phosphate catalyst was mixed at 100° C. with the solution of 3,9-divinylspirobi-(m-dioxane) and 1,1,3-tris(hydroxyphenyl)-propanes and stirred at 90° C. for five minutes. The liquid was then cast in molds and cured in an oven for 21 hours at 100° C. The product was a hard, brittle resin similar to that obtained in Example 2.

Example 5

A mixture of 86.5 g. (0.36 mole) of 3,9-diisopropenyl-spirobi(m-dioxane) and 40 g. (0.12 mole) of 1,1,3-tris-(hydroxyphenyl)-propanes was melted and stirred at 75° C., and then 0.37 g. of mixed alkanesulfonic acids was added. After stirring for five minutes at 90° C., the mixture was cast in bar molds. A hard, smooth resin which was red in color was obtained upon curing at 150° C. for 19 hours. The resin had the following properties:

Heat distortion _____° C__ 156
Impact (Izod) (ft.-lbs. per in. of notch) _____ 0.2
Hardness (durometer "D") _____ 92

Example 6

A mixture of 86.5 g. (0.36 mole) of 3,9-dipropenyl-spirobi(m-dioxane) and 80 g. (0.25 mole) of 1,1,3-tris-(hydroxyphenyl)propanes was melted and stirred at 60° C. while 0.266 g. of mixed alkanesulfonic acids was added. The mixture was stirred for five minutes at 60° C. and then cast in molds. After curing in an oven at 150° C. for 19 hours, a hard, smooth resin was obtained which was similar in properties to that produced in Example 5.

Example 7

A mixture of 127 g. (0.6 mole) of 3,9-divinylspirobi-(m-dioxane) and 66.8 g. (0.2 mole) of 2-methyl-1,1,3-tris-(hydroxyphenyl)-propanes was melted and stirred at 85° C. while 0.194 g. of mixed alkanesulfonic acids was added. After stirring for five minutes at 85° C., the product was poured into molds and cured for 16 hours in an oven at 150° C. The cured resin was hard and glossy and had these properties:

Heat distortion _____ ° C__ 199
Impact (Izod) (ft.-lbs. per in. of notch) _____ 0.1
Hardness (durometer "D") _____ 86

Example 8

A mixture of 95 g. (0.45 mole) of 3,9-divinylspirobi-(m-dioxane) and 63.6 g. (0.2 mole) of 1,1,3-tris(hydroxyphenyl)propene-2 was melted and stirred at 125° C. while a mixture of 32 g. (0.05 mole) of 3,9-divinylspirobi(m-dioxane) and 0.2 g. of diethyl sulfate was added. The mixture was stirred for 5 minutes at 110° C. and then poured into molds. After curing for 16 hours at 150° C., a hard glossy resin was obtained which had the following properties:

Heat distortion _____ ° C__ 200
Impact (Izod) (ft.-lbs. per in. of notch) _____ 0.1
Hardness (durometer "D") _____ 91

Example 9

1,1,3-tris(hydroxytolyl)propanes (64 g., 0.2 mole) was melted and stirred at 76° C. while adding a mixture of 63.6 g. (0.3 mole) of 3,9-divinylspirobi(m-dioxane) and 0.127 g. of mixed alkanesulfonic acids. After stirring for five minutes at 75–80° C., the mixture was poured into molds and cured in an oven at 150° C. for 16 hours. The product was a dark colored, hard resin with the following properties:

Heat distortion _____ ° C__ 155
Impact (Izod) (ft.-lbs. per in. of notch) _____ 0.1
Hardness (durometer "D") _____ 88

Example 10

A mixture of 40 g. (0.125 mole) of 1,1,3-tris(hydroxyphenyl)propanes 23.6 g. (0.25 mole) of phenol and 80 g. (0.375 mole) of 3,9-divinylspirobi(m-dioxane) was melted and stirred at 86° C. while a mixture of 89 g. (0.375 mole) of 3,9-divinylspirobi(m-dioxane) and 0.223 g. of mixed alkanesulfonic acids was added. Stirring was continued for 5 minutes and then the product was poured into molds. After curing in an oven at 150° C. for 16 hours, the hard dark red resin had these properties:

Heat distortion _____ ° C__ 179
Impact (Izod) (ft.-lbs. per in. of notch) _____ 0.2
Hardness (durometer "D") _____ 90

Example 11

A mixture of 85 g. (0.4 mole) of 3,9-divinylspirobi-(m-dioxane) and 20 g. (0.05 mole) of 1,1,2,2-tetrakis-(hydroxyphenyl)ethane was melted and stirred at 65° C., while 0.105 g. of mixed alkanesulfonic acids was added. The mixture was stirred at 65° C. for 5 minutes and then poured into molds. After curing at 150° C. for 16 hours, the product was a dark colored, glossy resin with these properties:

Heat distortion _____ ° C__ 129
Impact (Izod) (ft.-lbs. per in. of notch) _____ 0.2
Hardness (durometer "D") _____ 89

Example 12

A mixture of 85 g. (0.4 mole) of 3,9-divinylspirobi-(m-dioxane) and 44 g. (0.1 mole) of 1,1,5,5-tetrakis-(hydroxyphenyl)pentane was melted and stirred at 125° C. for 10 minutes. The mixture was then cured, without the addition of catalyst, at 150° C. for 3 hours. The product was a hard, dark colored resin with the following properties:

Heat distortion _____ ° C__ 147
Impact (Izod) (ft.-lbs. per in. of notch) _____ 0.2
Hardness (durometer "D") _____ 89

Example 13

A mixture of 85 g. (0.4 mole) of 3,9-divinylspirobi-(m-dioxane) and 24 g. (0.05 mole) of 1,1,6,6-tetrakis-(hydroxyphenyl)hexan-2-ol was melted and stirred at 65° C. while 0.109 g. of mixed alkanesulfonic acids was added. After stirring at 65° C. for five minutes, the product was cured in an oven at 150° C. for 16 hours. The cured resin had the following properties:

Heat distortion _____ ° C__ 190
Impact (Izod) (ft.-lbs. per in. of notch) _____ 0.3
Hardness (durometer "D") _____ 89

What is claimed is:

1. A resinous heat reaction product of (a) a polynuclear phenol selected from the group consisting of the trisphenols and tetrakisphenols, wherein the hydroxy-substituted phenyl radicals of said polynuclear phenol are each unsubstituted in at least one of the positions ortho and para to the hydroxyl radical and are directly connceted to each other through an aliphatic radical selected from the group consisting of the saturated and olefinically unsaturated aliphatic radicals containing from 1 to 12 carbon atoms, and (b) a 3,9-dialkenylspirobi(m-dioxane) having from 2 to 3 carbon atoms in the alkenyl radical and having the double bond of the alkenyl radical and having the double bond of the alkenyl radical in the alpha position, in a ratio of from 0.25 mole to 1 mole of said 3,9-dialkenylspirobi(m-dioxane) per each unsubstituted position ortho and para to the phenolic hydroxyl radicals of said polynuclear phenol.

2. The resinous heat reaction product according to claim 1 wherein the 3,9-dialkenylspirobi(m-dioxane) is 3,9-divinylspirobi(m-dioxane).

3. The resinous heat reaction product according to claim 1 wherein the polynuclear phenol is 1,1,3-tris(hydroxyphenyl) propane.

4. The resinous heat reaction product according to claim 1 wherein the polynuclear phenol is 1,1,2,2-tetrakis-(hydroxyphenyl)ethane.

5. The resinous heat reaction product of 1,1,3-tris-(hydroxyphenyl)propane and from 0.25 mole to 1 mole of 3,9-divinylspirobi(m-dioxane) per each unsubstituted position ortho and para to the phenolic hydroxyl radicals of said 1,1,3-tris-(hydroxyphenyl)propane.

6. The resinous heat reaction product of 2-methyl-1,1,3-tris(hydroxyphenyl)propane and from 0.25 mole to 1 mole of 3,9-divinylspirobi(m-dioxane) per each unsubstituted position ortho and para to the phenolic hydroxyl radicals of said 2-methyl-1,1,3-tris(hydroxyphenyl)-propane.

7. The resinous heat reaction product of 1,1,6,6-tetrakis-(hydroxyphenyl)hexan-2-ol and from 0.25 mole to 1 mole of 3,9-divinylspirobi(m-dioxane) per each unsubstituted position ortho and para to the phenolic hydroxyl radicals of said 1,1,6,6-tetrakis(hydroxyphenyl)hexan-2-ol. (aiov(nxvantiaids 8. The resinous heat reaction product of 1,1,2,2-tetrakis-(hydroxyphenyl)ethane and from 0.25 mole to 1 mole of 3,9-divinylspirobi(m-dioxane) per each unsubstituted position ortho and para to the phenolic hydroxy radicals of said 1,1,2,2-tetrakis(hydroxyphenyl)ethane.

9. The resinous heat reaction product of 1,1,5,5-tetrakis-(hydroxyphenyl)pentane and from 0.25 mole to 1 mole of 3,9-divinylspirobi(m-dioxane) per each unsubstituted position ortho and para to the phenolic hydroxy radicals of said 1,1,5,5-tetrakis(hydroxyphenyl)penthane.

10. The resinous heat reaction product of 1,1,3-tris- (hydroxyphenyl)propane and from 0.25 mole to 1 mole of 3,9-dipropenylspirobi(m-dioxane) per each unsubstituted position ortho and para to the phenolic hydroxyl radicals of said 1,1,3-tris(hydroxyphenyl)propane.

11. The process for producing a thermoset resin which comprises heating, at a reaction temperature of from about 55° C. to about 160° C. and in contact with an acid catalyst, (a) a polynuclear phenol selected from the group consisting of the trisphenol and the tetrakisphenols, wherein the hydroxy-substituted phenyl radicals of said polynuclear phenol are each unsubstituted in at least one of the positions ortho and para to the hydroxyl radical and are directly connected to each other through an aliphatic radical selected from the group consisting of the saturated and olefinically unsaturated aliphatic radicals containing from 1 to 12 carbon atoms, and (b) a 3,9-dialkenylspirobi(m-dioxane) having from 2 to 3 carbon atoms in the alkenyl radical and having the double bond of the alkenyl radical and having the double bond of the alkenyl radical in the alpha position, in a ratio of from 0.25 mole to 1 mole of said 3,9-dialkenylspirobi(m-dioxane) per each unsubstituted position ortho and para to the phenolic hydroxyl radicals of said polynuclear phenol to form a liquid resin, and subsequently heating said liquid resin at a temperature higher than said reaction temperature to form a solid thermoset resin.

12. The process according to claim 1 wherein the 3,9-dialkenylspirobi(m-dioxane) is 3,9-divinylspirobi(m-dioxane).

13. The process according to claim 1 wherein the polynuclear phenol is 1,1,3-tris(hydroxyphenyl)propane.

14. The process according to claim 1 wherein the polynuclear phenol is 1,1,2,2-tetrakis(hydroxyphenyl)ethane.

References Cited in the file of this patent

UNITED STATES PATENTS

| | | |
|---|---|---|
| 2,735,872 | Beaver et al. | Feb. 21, 1956 |
| 2,806,016 | Schwarzer | Sept. 10, 1957 |

FOREIGN PATENTS

| | | |
|---|---|---|
| 852,301 | Germany | Aug. 14, 1952 |
| 881,108 | Germany | May 13, 1953 |